R. Shaler,

Knife Scourer.

No. 580. Reissued Aug. 10, 1858.

N. PETERS, PHOTO-LITHOGRAPHER, WASHINGTON, D. C.

UNITED STATES PATENT OFFICE.

W. H. HORSTMANN, OF NEW YORK, N. Y., ASSIGNEE OF R. SHALER.

IMPROVEMENT IN KNIFE-POLISHERS.

Specification forming part of Letters Patent No. 5,941, dated November 28, 1848; Reissue No. 580, dated August 10, 1858.

*To all whom it may concern:*

Be it known that REUBEN SHALER, of Madison, Connecticut, did invent a certain Improvement in Knife-Polishers, for which Letters Patent were granted on the 28th day of November, 1848, on an imperfect specification and claim, which I hereby desire to amend. I hereby declare the following to be an amended description more fully setting forth the said invention.

Figure 2:
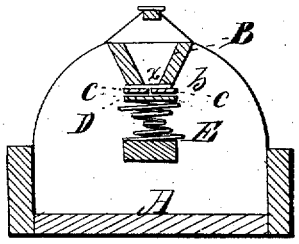
Figure 3:
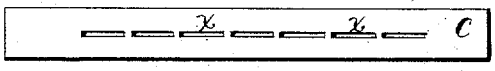
Figure 1:
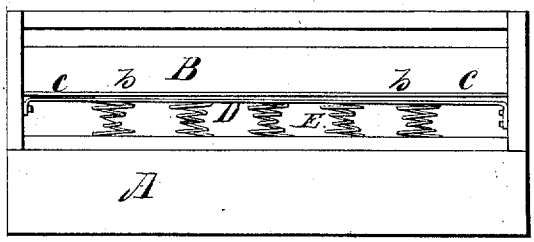

In the accompanying drawings, Figure 1 is a side elevation of one modification of my machine, made of wood. (It is obvious that when made of iron other configurations would be necessary.) Fig. 2 is a cross section; Fig. 3, the under side of the upper polishing-surface.

This new knife-polisher is composed of three elementary parts essential to its operation, which are the especial invention desired to be secured by these Letters Patent: First, two surfaces, such as leather or other proper material, between which a knife is thrust and polished, which surfaces are held together by springs or other elastic medium so as to keep said polishing-surfaces in close and proper contact with the knife while being passed between them, which is the second element; and, thirdly, a hopper so connected with one of the polishing-surfaces as to discharge a quantity of polishing-powder with which it is filled through a hole or holes as seen at *x x*, Figs. 2 and 3, directly between the polishing-surfaces upon the article between them.

To illustrate this invention I will describe the modification, made of wood, shown in the drawings, first premising that the article may be of any suitable size and adapted as any competent mechanician may suggest, so as to embrace the three above-named elements, which, combined, form the invention.

A is a box, forming the base of the machine, but not essential to its operation. At the ends of this box are two standards, *a a*, between which the polishing apparatus is supported.

B is a hopper, made to contain the polishing-powder, of whatever kind used, which hopper has a flat bottom piece, *b*, to which is affixed a piece of leather, *c*, or other suitable material, that serves as a polishing-surface. Through the bottom of the hopper and this leather *c* there are a series of holes, as shown in Figs. 2 and 3, letters *x x*, through which the polishing material in the hopper descends upon the surfaces below.

Directly under the leather *c* is a similar flat polishing-surface, D, that is kept in contact with it throughout its whole length when nothing is between them by means of springs.

The springs E, shown in the drawings, are spiral wire like those used in furniture; but a single spring or springs of a different character may be employed to hold these surfaces against each other—such, for instance, as a layer of india-rubber. The two polishing-surfaces are held in position by the end standards or guides, the leathers or other suitable materials *c* and D being affixed by screws or otherwise to their bases.

The mode of using this apparatus is to fill the hopper with polishing-powder and then to pass the blade of the knife to be cleaned through between the surfaces *c* and D, which are pressed against the knife on both sides by the springs. The action of rubbing the knife forward and back sifts a sufficient quantity of the polishing material down between the surfaces to produce the desired effect in the most expeditious and economical manner.

Having thus fully set forth the invention, what I claim therein as the invention of REUBEN SHALER is—

The combination of the hopper B, polishing-surfaces *c* and D, and springs E, or their equivalents, substantially in the manner and for the purposes set forth.

WILLIAM H. HORSTMANN,
*Assignee of Reuben Shaler.*

Witnesses:
T. H. DREW, Jr.,
EDMUND BOWLY.